United States Patent Office 2,914,844
Patented Dec. 1, 1959

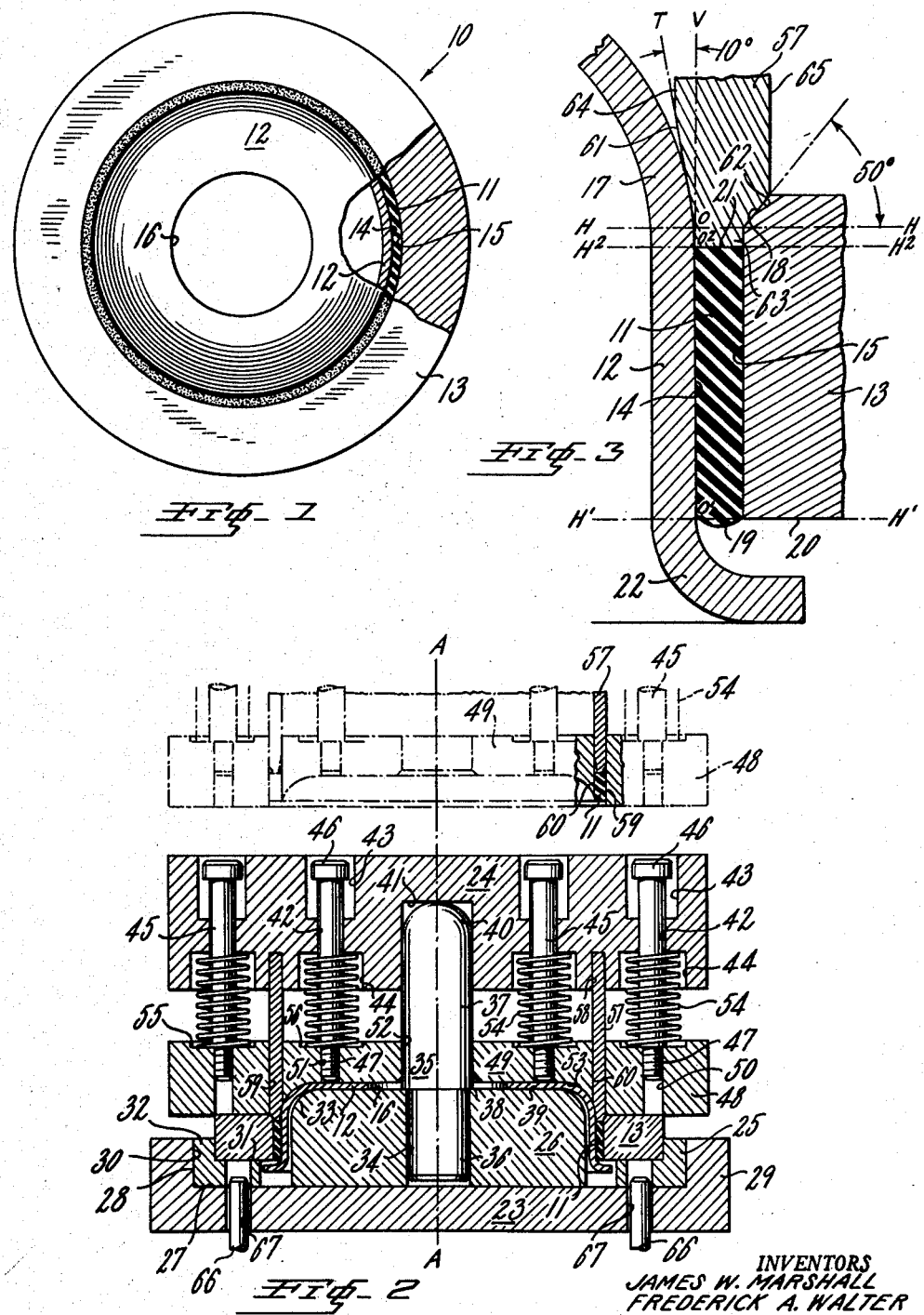

2,914,844

APPARATUS FOR ASSEMBLING A VIBRATION DAMPER

James W. Marshall and Frederick A. Walter, Fort Wayne, Ind., assignors to United States Rubber Company, New York, N.Y., a corporation of New Jersey Application April 19, 1955, Serial No. 502,281

6 Claims. (Cl. 29—235)

This invention relates to the manufacture of vibration dampers and more particularly to an improved simplified apparatus for assembling a vibration damper.

The type of vibration damper with which this invention is primarily concerned is that which is mounted on a crankshaft of an internal combustion engine. The primary purpose of such a device is to dampen out or reduce torsional vibrations set up in the crankshaft by the explosive forces in the engine and the reciprocating masses therein, although it may be adapted to any other shaft subject to vibrational impulses. Generally speaking, a vibration damper comprises a resilient annulus interposed between an outer rigid member known as an inertia ring and an inner rigid member known as a central hub, the latter being secured to the crankshaft. The annulus holds the hub and ring in assembled relationship but permits limited relative rotation therebetween to provide the desired damping action.

In the prior art, the assembly of vibration dampers involves numerous time consuming operations as well as various types of complex apparatus. As a consequence, production is limited and equipment expensive, both contributing to increased assembly costs. For example, in Patent 1,976,789 the resilient annulus must first be accurately located between the central hub and inertia ring, and this position must be maintained while the damper assembly is placed in a vulcanizing chamber to bond the annulus to the inner and outer rigid members. Although the necessity of vulcanizing the annulus to the hub and ring has been avoided by Patent 2,556,999, the annulus must nevertheless be initially located within the outer rigid member and both held in proper position by some means while the two plates forming the inner rigid member are forced together by suitable pressure applying means. Moreover, these plates must be held together by the pressure applying means or some other means while a suitable riveting device is used to secure them permanently.

Therefore, the primary object of this invention is to provide an improved simplified apparatus for assembling a vibration damper quickly, easily and economically. To this end, many of the numerous assembly operations and devices formerly required have been eliminated by locating the unassembled annulus, hub and ring in proper relationship with each other in a single apparatus incorporating in itself all the simplified apparatus supports needed for facilitating the performance of the locating operation, by applying pressure with rigid means also incorporated in said apparatus to telescopically force the annulus, hub and ring into assembled relationship in one rapid stroke, and by so proportioning the annulus in undeformed condition as well as by so constructing the pressure applying member, hub and/or ring that the annulus is properly positioned between and in secure engagement with the hub and ring at the completion of the aforementioned stroke.

Other objects and advantages of the invention will become apparent upon consideration of the following specification and claims when read in connection with the accompanying drawing wherein:

Fig. 1 is a top plan view, partially in section, of a vibration damper produced in accordance with the teachings of the invention;

Fig. 2 is a vertical sectional view illustrating the apparatus employed in assembling the damper of Fig. 1, part of the upper portion of the apparatus being shown in phantom outline to indicate its position prior to the pressure applying stroke; the outline being partially broken away to illustrate in section the undeformed annulus supported therein, and the upper and lower portions of the apparatus being shown in solid lines to indicate their structure and position, as well as those of the damper parts, at the completion of the stroke; and Fig. 3 is an enlargement of a portion of Fig. 2 illustrating in detail the special structural features of the pressure applying member, hub and ring, as well as their relationship to each other at the completion of the pressure applying stroke.

Referring now to Figs. 1 and 2, the vibration damper 10 comprises a resilient annulus 11 which is preferably made of natural or synthetic rubber, although any other suitable elastic material may be employed. The annulus 11 is interposed between the adjacent peripheral surfaces 14 and 15 of a central hub 12 and an outer inertia ring 13 respectively. The central hub 12 is preferably made of a stamped sheet metal such as steel and has a bore 16 for mounting the hub on a crankshaft (not shown), while the inertia ring 13 is preferably fabricated of cast iron or some other relatively dense and heavy material. For the particular embodiment illustrated, it was required that the annulus 11 be capable of being compressed 25–40% to allow for a minimum of 200 foot-pounds slip torque between the annulus 11 and the adjacent peripheral surfaces 14 and 15. It has been found that a 67 durometer rubber is suitable for this purpose and also has a sufficient deflection range to permit the desired limited relative rotation between the hub and ring.

Referring briefly to Fig. 3, the adjacent peripheral surfaces 14 of the hub 12 and 15 of ring 13 have annular tapered portions 17 and 18 extending therefrom to form a converging entrance thereto. The tapered portion 17 on the hub 12 is arcuate in cross-section while the tapered portion 18 on ring 13 is a chamfer. The hub 12 and ring 13 are so constructed that the tapered portion 18 makes an angle of 50° with the horizontal plane H—H while a line T which intersects plane H—H and vertical line V at point O and which makes an angle of 10° with line V, is tangent to arcuate tapered portion 17. As stated above, these tapered portions 17 and 18 form a converging entrance to the spaced peripheral surfaces 14 and 15, the purpose of which is to prevent the annulus 11 from being sheared or torn as it is forced in between these surfaces.

Although the convex bottom radial face 19 of annulus 11 may bulge outwardly beyond bottom surface 20 of ring 13, and the flattened top radial face 21 may do likewise beyond plane $H^2$—$H^2$ when permitted to take its normal convex shape, it will be apparent that the annulus 11 lies substantially between planes $H^1$—$H^1$ and $H^2$—$H^2$. It will also be observed that the arcuate portion 17 of hub 12 merges into peripheral surface 14 at point $O^2$ in plane $H^2$—$H^2$, while flange 22 of the hub begins at point $O^1$ in plane $H^1$—$H^1$. Between planes $H^1$—$H^1$ and $H^2$—$H^2$, peripheral surfaces 14 and 15 are concentric and equidistant, and thus the substantially coextensive annulus 11 will exert a uniform radial pressure throughout its length against peripheral surfaces 14 and 15 to keep hub 12 and ring 13 in axial alignment with each other. As the damper 10 is rotated in service, this precise positioning of the annulus 11 will prevent any wobbling between hub 12 and inertia ring 13 during its rotation. Were the full radial thickness of the annulus 11 to extend any substantial distance beyond plane $H^1$—$H^1$ or $H^2$—$H^2$, it would tend to force hub 12 and inertia ring 13 out of alignment, thereby inducing undesirable vibrations in the damper 10 itself, and reducing its effectiveness in damping the vibrations of the crankshaft. The device employed for obtaining such accurate positioning of annulus 11 will be described below in connection with the apparatus of which it is a part.

Referring now to Fig. 2, the apparatus comprises a lower platen 23 and an upper platen 24 which may be mounted in a conventional press (not shown) by any suitable means (not shown). The press may be actuated by hydraulic or other means (not shown) in order to move platens 23 and 24 relatively to one another. Either platen may remain stationary while the other is reciprocated, or both may be moved toward and away from each other, depending upon the type of press employed. It is preferable however, that the platens 23 and 24 be mounted in axial alignment with each other along line A—A in order to properly assemble damper 10, as will become more apparent below.

The lower platen 23 has a pair of concentrically spaced members 25 and 26 mounted thereon for supporting the hub 12 and inertia ring 13 in spaced concentric relationship. Member 25 is ring-shaped and is centered on axis A—A in shallow cylindrical recess 27 cut in platen 23, the outer periphery 28 of ring 25 fitting snugly against the inner periphery 30 of annular flange 29. Ring 25 has a recess 31 and flange 32 similar to those on platen 23 for centering and supporting inertia ring 13. Member 26 is a relatively thick cylindrical block centrally positioned in recess 27 in platen 23 and is rounded off at 33 to accommodate the arcuate portion 17 of hub 12. Members or positioning means 25 and 26 are preferably rigidly secured to platen 23 by any suitable fastening means (not shown).

Block 26 is also provided with a central bore 34 in which the reduced end 36 of a cylindrical plug 35 is held by means of a press fit. Plug 35 has an enlarged head 37, the bottom of which forms a shoulder 38 resting on the upper surface 39 of block 26, and the top of which is rounded off at 40. The enlarged head 37 of plug 35 slidably projects into a central cylindrical recess 41 cut into upper platen 24 for guiding platen 24 and maintaining its alignment with axis A—A as it moves relatively to lower platen 23.

Upper platen 24 is provided with eight or more circumferentially and radially spaced inner and outer bores 42, only four of which are shown. The upper and lower ends of bores 42 are provided with enlarged recesses 43 and 44 respectively. Passing through bores 42 are rods 45, the upper ends of which have heads 46 disposed in recesses 43 and the opposite ends of which are externally threaded as at 47. Attached to rods 45 are a pair of concentrically spaced annular plates 48 and 49, the threaded ends 47 of rods 45 being screwed into internally threaded bores 50 in plate 48 and 51 in plate 49. Inner plate 49 is also provided with a central bore 52 for the passage of plug 35 which maintains plate 49 in alignment with axis A—A, and lower surface 53 of plate 49 is concave to closely fit hub 12. A plurality of coiled springs 54 surround rods 45, the upper ends of the springs 54 seating in recesses 44 in platen 24 and the lower ends thereof seating in recesses 55 and 56 in plates 48 and 49 respectively. Springs 54 are of the compression type and therefore urge the resiliently mounted plates 48 and 49 outwardly from upper platen 24, this outer movement being limited by engagement between heads 46 of bolts 45 and recesses 43 in platen 24.

Rigidly mounted in the lower portion of platen 24 is an annular steel die 57. The upper end of the die 57 fits snugly into an annular recess 58 in platen 24 and may be secured therein by welding or any other suitable means. As will be apparent, the die 57 extends between the adjacent peripheries 59 and 60 of plates 48 and 49 respectively, and is movable relatively thereto. Referring to Fig. 3, the lower end of die 57 is provided with downwardly converging annular tapered portions 61 and 62 and a reduced annular portion 63. The portion 61 extends outwardly from the inner peripheral surface 64 of die 57 while portion 62 extends inwardly from the outer peripheral surface 65, each of these portions intersecting the reduced portion 63 at the horizontal plane H—H. Obviously, the angularity of portions 61 and 62 are the same as line T tangent to arcuate portion 17, and chamfered surface 18 respectively. Thus, the tapered portions 61 and 62 on die 57 which fit snugly against the corresponding tapered portions 17 and 18 on hub 12 and inertia ring 13, and the reduced portion 63 which projects between the hub and ring, cooperate to properly position annulus 11 therein.

Referring to Fig. 2, the method of assembling the damper 10, together with the operation of the apparatus will now be described. The platens 23 and 24 are first moved apart from each other by the press (not shown) until plates 48 and 49 are in the position shown in phantom outline. Next, the hub 12 and inertia ring 13 are located in substantially spaced concentric realtionship on members 26 and 25 respectively. The undeformed annulus 11 is now positioned in substantially axial alignment with hub 12 and ring 13 by inserting the annulus between the adjacent peripheries 59 and 60 of plates 48 and 49 respectively, as shown in the partial section broken out of the phantom outline.

As will be apparent, the adjacent peripheries 59 and 60 of plates 48 and 49 are considerably farther apart than the corresponding peripheral surfaces 14 and 15 of hub 12 and inertia ring 13, in order to accommodate and support the annulus 11 in undeformed condition. The lower portion of die 57 also serves as a stop to assist the operator in determining how far the annulus is to be inserted between plates 48 and 49. Moreover, even though the outer periphery 60 of inner plate 49 is not completely coextensive with inner periphery 59 of outer plate 48, the die 57 is recessed far enough when plates 48 and 49 are fully extended by springs 54 so that the entire inner and outer peripheries of the undeformed annulus 11 are supported by the adjacent peripheries 59 and 60 of the plates. This is important in order to maintain the annulus 11 in true alignment with hub 12 and ring 13 prior to the assembly stroke.

The platens 23 and 24 are now moved toward each other; the head 37 of plug 35 first passes through bore 52 in plate 49, and then into recess 41 in upper platen 24 to ensure alignment of the various press parts with each other along axis A—A. As the platens 23 and 24 continue to approach each other, the plates 48 and 49 simultaneously engage ring 13 and hub 12 to maintain the latter in spaced concentric relationship. In case it is necessary for the hub 12 to be shifted laterally somewhat to closely engage the concave surface 53 on plate 49, the rounded portion 33 and the diameter of block 26 are made slightly smaller than arcuate portion 17 and the diameter of hub 12 to permit such movement. It is also important to note that the relative position of plates 48 and 49 does not change as the plates move from their upper position (in phantom outline) into engagement with hub 12 and inertia ring 13 (solid line position). Thus, the annulus 11 is continuously supported by the adjacent peripheries 59 and 60 of plates 48 and 49 respectively, until it is squeezed by tapered portions 17 and 18 of hub 12 and inertia ring 13.

As the platens 23 and 24 move closer together, the springs 54 are compressed and annular die 57 moves downward relatively to and between them. The die 57 applies axial pressure to the upper radial face 21 of annulus 11 to telescopically force the annulus into assembled relationship with hub 12 and inertia ring 13 in one rapid stroke. For the particular embodiment illustrated this pressure is of the order of 6,000 pounds per square inch to obtain the desired compression of annulus 11. During the pressure applying stroke of die 57, the annulus 11 first passes through the converging entrance formed by tapered portions 17 and 18 extending from the adjacent peripheral surfaces 14 and 15 of hub 12 and inertia ring 13 respectively, and then in between peripheral surfaces 14 and 15 themselves. As this occurs, the annulus 11 is simultaneously radially compressed and axially elongated to be properly positioned between and securely engage the aforementioned peripheral surfaces.

As stated previously, tapered portions 17 and 18 provide a smooth converging entrance to peripheral surfaces 14 and 15 to prevent the annulus 11 from shearing or tearing as it is forced in between the hub 12 and ring 13. The tapered portions 17 and 18 have another equally important function, and that is to provide a close fitting seat for the tapered portions 61 and 62 on the lower end of die 57, at the completion of the pressure applying stroke. As seen in Fig. 3, the reduced portion 63 and tapered portions 61 and 62 of die 57 ensure that the annulus 11 is properly positioned between hub 12 and ring 13. The primary purpose of reduced portion 63 is to force the deformed annulus 11 far enough between hub 12 and inertia ring 13 so that the full radial thickness of the annulus 11 lies between planes $H^1$—$H^1$ and $H^2$—$H^2$. Naturally, the undeformed annulus 11 is so proportioned that it will be elongated under compression to be substantially coextensive with the distance between these planes. Thus, the uniformly deformed annulus 11 will maintain the hub 12 and inertia ring 13 in axial alignment when damper 10 is rotated on its crankshaft (not shown).

Referring back to Fig. 2, it will be noted that the reduced portion 63 of die 57 does not engage the full radial face 21 of undeformed annulus 11. As may be expected, the unsupported portion of face 21 may have a tendency to extrude backwardly around the reduced portion 63 and against tapered portions 61 and 62 of die 57 because of the friction developed between annulus 11 and plates 48 and 49, during the pressure applying stroke. However, as the tapered portions 61 and 62 approach the corresponding tapered portions 17 and 18 on hub 12 and inertia ring 13, this backwardly extruding rubber will become compressed more and more between the aforementioned tapered portions until all or practically all of it extrudes forwardly with the rest of the annulus 11 into the space formed between hub 12 and ring 13. Any amount of rubber which might possibly be sheared or scraped off in the process would be too small to have any more than a negligible effect on the proper positioning of annulus 11 between the hub 12 and ring 13.

Thus, it will be apparent that no lubricant of any kind is necessary to make the assembly operation successful. If desired, however, the peripheries of annulus 11 may be coated with a suitable lubricant such as a mixture of 20% petrolatum and 80% light mineral oil. This will completely eliminate any tendency of the annulus 11 to extrude backwardly during the pressure applying stroke. However, care should be taken to keep the lubricant coating thin so that substantially all of it will be wiped off the annulus 11 as the latter is squeezed between hub 12 and inertia ring 13, in order to prevent any undesirable slippage between these damper parts.

Upon completion of the pressure applying stroke, the platens 23 and 24 are again moved apart until the plates 48 and 49 assume the position shown in phantom outline. The damper 10 may now be removed from members 23 and 24 by any suitable means forming no part of the present invention. For the sake of clarity and completeness, however, there is shown a plurality of ejector pins 66, which may be simultaneously reciprocated through circumferentially spaced bores 67 extending through platen 23 and member 25, by a convenient actuating means (not shown). As is apparent, the ejector pins 66 may be actuated to engage inertia ring 13 and lift damper 10 high enough so that the operator can easily grasp the ring to completely remove damper 10 and prepare for the next assembly operation. The space between block 26 and hub 12 will facilitate the removal of damper 10 because only the flat upper surface 39 of the block is in direct contact with the hub, while the compressed annulus 11 will keep inertia ring 13 in alignment with hub 12 so that ring 13 will slide out of recess 31 in member 25 without difficulty.

While the invention has been shown and described in a certain preferred form, it is to be understood that various changes and modifications may be made therein by one skilled in the art without departing from the principle of the invention, the scope of which is to be determined by the appended claims.

Having thus described our invention, what we claim and desire to protect by Letters Patent is:

1. Apparatus for assembling a vibration damper having a resilient annulus interposed between the adjacent peripheral surfaces of a central hub and an outer inertia ring, one of said peripheral surfaces having a tapered portion to form a converging entrance to the annulus-accommodating space between said surfaces, said apparatus comprising a pair of platens movable relatively to each other, a pair of concentrically spaced members mounted on one of said platens and engageable with said hub and ring, respectively, for supporting the same in spaced concentric relationship, a pair of concentric, radially spaced, annular plates resiliently mounted on the other of said platens and operable upon approaching relative movement of said platens to engage said hub and ring, respectively, to fix the same in position in said spaced concentric relationship on said members, said plates supporting within the annular space therebetween said annulus in undeformed condition and in spaced axial alignment with said hub and ring, and an annular die rigidly mounted on said other platen in axial alignment with said annular space between said plates for movement relative to said plates and through said last-named space to apply axial pressure to said annulus so as to force the same and said hub and ring telescopically into assembled relationship in one rapid stroke, one of the peripheral surfaces of said die having a tapered portion extending therefrom for engagement at the completion of said stroke with the tapered surface portion forming said converging entrance to said annulus-accommodating space between said hub and ring.

2. Apparatus for assembling a vibration damper having a resilient annulus interposed between the adjacent peripheral surfaces of a central hub and an outer inertia ring, each of said peripheral surfaces having a tapered portion to form a converging entrance to the annulus-accommodating space between said surfaces, said apparatus comprising a pair of platens movable relatively to each other, a pair of concentrically spaced members mounted on one of said platens and engageable with said hub and ring, respectively, for supporting the same in spaced concentric relationship, a pair of concentric radially spaced, annular plates resiliently mounted on the other of said platens and operable upon approaching relative movement of said platens to engage said hub and ring, respectively, to fix the same in position in said spaced concentric relationship on said members, said plates supporting within the annular space defined therebetween said annulus in undeformed condition and in spaced axial alignment with said hub and ring, and an annular die rigidly mounted on said other platen in axial alignment with said annular space between said plates for movement relative to said plates and through said last-named space to apply axial pressure to said annulus so as to telescopically force it into assembled relationship with said hub and ring in one rapid stroke, each of the peripheral surfaces of said die having a tapered portion extending therefrom for engagement at the completion of said stroke with the tapered surface portions forming said converging entrance to said annulus-accommodating space between said hub and ring.

3. Apparatus for assembling a vibration damper having a resilient annulus interposed between a central hub and an outer inertia ring, said apparatus comprising positioning means for supporting the hub within said ring in spaced relation to each other; a pair of plates concentrically spaced so as to provide an annular opening therebetween, said plates being mounted for simultaneous movement relative to the positioning means, for supporting the annulus within said opening in an undeformed state spaced from the hub and ring and in axial alignment with the space between said hub and ring and for engaging the same upon simultaneous movement relative to said positioning means to thereby fix said hub and ring in position between said positioning means and said plates; and means for applying pressure to said annulus so as to displace the same from the annular opening between said plates and to telescopically force and deform said annulus into the space between said hub and ring in one rapid stroke.

4. Apparatus as defined in claim 3 wherein said positioning means comprises inner and outer concentrically spaced members for supporting the hub and ring respectively, said inner member having a diameter slightly smaller than the diameter of the hub so as to insure accurate engagement of said hub with said plates and to facilitate removal of the assembled damper.

5. Apparatus for assembling a vibration damper having a resilient annulus interposed between a central hub and an outer inertia ring, said apparatus comprising an upper and a lower platen reciprocable relative to each other to clamp the ring and hub of said damper therebetween, said lower platen having means thereon for retaining said hub within said inertia ring in spaced relation to each other, said upper platen having spaced inner and outer plates depending from the lower side thereof and vertically and simultaneously movable with respect thereto, a die rigidly affixed to said platen and in vertical alignment with the space between said inner and outer plates and the space between said inertia ring and said hub, said space between said inner and outer plates being wider than said space between said inertia ring and said hub and adapted to receive and hold said annulus in its undeformed condition spaced from said inertia ring and hub, and said die being adapted to extend into said space between said inner and outer plates and to force and deform said annulus into said space between said inertia ring and hub upon clamping said inertia ring and hub between said platens.

6. Apparatus as defined in claim 5, wherein the entrance to the upper end of the space formed between the inertia ring and hub is funnel-shaped and the lower end of said die is adapted to extend into said space and conform to the shape of said entrance.

References Cited in the file of this patent
UNITED STATES PATENTS

| | | |
|---|---|---|
| 1,904,931 | Rosenberg | Apr. 18, 1933 |
| 1,913,198 | Geyer | June 6, 1933 |
| 1,959,254 | Zerk | May 15, 1934 |
| 2,031,797 | Tarbox | Feb. 25, 1936 |
| 2,117,046 | Welker | May 10, 1938 |
| 2,263,815 | Northrup | Nov. 25, 1941 |
| 2,303,689 | Graham | Dec. 1, 1942 |
| 2,639,496 | Harzell | May 26, 1953 |
| 2,763,055 | Hardy | Sept. 18, 1956 |